United States Patent
Miyamoto et al.

(10) Patent No.: US 6,728,197 B2
(45) Date of Patent: Apr. 27, 2004

(54) OPTICAL DISK HAVING A PLURALITY OF INFORMATION RECORDING UNITS

(75) Inventors: Harukazu Miyamoto, Higashimurayama (JP); Takeshi Maeda, Kokubunji (JP); Toshimichi Shintani, Kodaira (JP); Takahiro Kurokawa, Kokubunji (JP); Tetsuo Ariyoshi, Kokubunji (JP); Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 09/925,411

(22) Filed: Aug. 10, 2001

(65) Prior Publication Data

US 2003/0053403 A1 Mar. 20, 2003

(30) Foreign Application Priority Data

Oct. 10, 2000 (JP) ........................................ 2000-314431

(51) Int. Cl.[7] ................................................ G11B 7/24
(52) U.S. Cl. ................................... 369/275.4; 428/64.4
(58) Field of Search ........................... 369/275.4, 275.1, 369/275.2, 275.3, 277, 278, 279, 13.55; 428/64.1, 64.3, 64.4

(56) References Cited

U.S. PATENT DOCUMENTS

| 5,539,724 A | * | 7/1996 | Ohtomo ................... 369/275.4 |
| 6,069,870 A | * | 5/2000 | Maeda et al. ............ 369/275.4 |
| 6,097,695 A | * | 8/2000 | Kobayashi ............... 369/275.4 |
| 6,208,614 B1 | * | 3/2001 | Kim ....................... 369/275.4 |
| 6,266,318 B1 | * | 7/2001 | Honda et al. ............ 369/275.3 |
| 6,292,458 B1 | * | 9/2001 | Eguchi et al. ........... 369/275.3 |
| 6,373,815 B1 | * | 4/2002 | Ishida et al. ............ 369/275.3 |

FOREIGN PATENT DOCUMENTS

| JP | 62-97138 | 5/1987 |
| JP | 2-265022 | 10/1990 |
| JP | 5-144186 | 6/1993 |
| JP | 6-103610 | 4/1994 |
| JP | 6-243468 | 9/1994 |
| JP | 8-7290 | 1/1996 |
| JP | 2856390 | 11/1998 |

OTHER PUBLICATIONS

Patent Abstracts of Japan 10–091967, Apr. 10, 1998.*
English Language Abstracts of Japan 62–09138, May 6, 1987.*
Patent Abstract of Japan 06–103610, Apr. 15, 1994.*
Patent Abstracts of Japan 08–007290, Jan. 12, 1996.*
Patent Abstracts of Japan 05–155186, Jun. 11, 1993.*
Patent Abstracts of Japan 06–243468, Sep. 2, 1994.*

* cited by examiner

*Primary Examiner*—Tan Dinh
(74) *Attorney, Agent, or Firm*—Antonelli, Terry, Stout & Kraus, LLP

(57) ABSTRACT

In the recordable type multilayer optical disk, locations of an information recording unit region and of ID or address data of adjacent plural tracks on a recording medium are configured so as to be shifted in the circumferential direction by 5 $\mu$m or more. Since an effect from a layer that is not selected can be remarkably reduced, multilayer recording/reproducing can be realized. Moreover, ID or address data do not center at the same position in reference to the circumferential direction, the effect of distortion that is generated on the disk substrate and the recording layer at the time of optical disk formation or multiple overwriting can be minimized, and design and fabrication tolerances of the optical disk are extended, and, as a result, the media can be provided with a low cost.

14 Claims, 8 Drawing Sheets

OPTICAL DISK HAVING A PLURALITY OF INFORMATION RECORDING UNITS

BACKGROUND OF THE INVENTION

The present invention relates to a recording format of a large-capacity recordable type optical disk; and, more specifically, the invention relates to a multilayer large-capacity optical disk that is capable of performing random recording and which has more than one information recording layer.

One example of the track configuration of a conventional optical disk will be described with reference to FIG. 11. A plurality of groove tracks 11 and land tracks 12 are arranged alternately in a radial direction of a disk-shaped recording medium. Each track is wobbled in a radial direction by a relatively small amount. Further, each track is divided into a plurality of arc sectors aligned in a radial direction; and, at a beginning end of each arc sector, a header 6 containing address information is arranged, whereby a recorded region in the arc sector is identified. Therefore, the headers 6 are aligned in a radial direction, that is, they are arranged on plural radials. In this example, the width of each track is approximately 0.6 μm and the groove depth of the groove is approximately 60 nm. In this example, the length of the sector is approximately 6 mm, which corresponds to a user capacity of 2048 bytes. The groove and the land are wobbled in a radial direction by an amplitude of approximately 20 nm. The wobble period is set to 1/232 times the sector length, namely approximately 25 μm. This ratio of 1:232 is chosen so as to fulfil the need for a wobble period to be an integer multiple of the length of the recorded data (channel bit length). The reason for this is to make it possible to generate a recording clock from the wobble easily.

FIG. 11 is a view showing details of the header part at the top end of the track, namely an ID or address data part. In FIG. 11, pieces of the ID or address data are arranged so as to be aligned in a radial direction at a first location 631 and at a second location 632. A track and its neighboring tracks are connected in such a way that the track on the groove 11 connects to such and the track on the land 12 connects to such. In the example of this figure, each ID or address data shown in the figure corresponds to the recorded region that is located on the right side thereof. Further, the ID or address data corresponding to a groove information track 3 on the right side of the figure is arranged at the first location 631; the ID or address data corresponding to a land information track 4 is arranged at the second location 632. That is, the arrangement is such that, for adjacent tracks, locations of the ID or address data are different from each other in a direction along the information track, and for adjacent-but-one tracks, locations of the ID or address data agree with each other in that direction. That is, looking at the configuration on a boundary line between a land track and a groove track, the configuration is such that the location for the ID or address data is divided into first and second regions, and either the first or second ID or address data region is arranged alternately, the same ID or address data region for every other track.

By virtue of this configuration, for example, when the light spot 21 scans the groove 11, either pits of the first or second ID or address data are reproduced and there isn't a fear that crosstalk from the adjacent tracks would be generated. Therefore, it becomes possible to reproduce the address data allocated in prepits excellently without generating crosstalk. In this example, the address information of the prepits is recorded by means of the 8/16 modulation code (channel bit length: 0.14 μm).

The ID or address data of the header part is formed with small hollows (pits), and these are formed as an unevenness of the substrate or other features together with the groove etc. during the manufacture of the disk.

A phase change type recording layer (GeSbTe) is used as the recording layer, and the recorded mark is formed in the form of a non-crystalline region.

Regarding the foregoing conventional examples, for example, JP-C-2856390 gives a detailed description.

With an arrangement of the ID or address data are provided in the above-mentioned conventional example, the effect of crosstalk arising from the ID or address data of the adjacent tracks can be eliminated. However, there is a problem in that, when the data is reproduced, for example, under a condition such that the ID or address data of a certain track and that of an adjacent-but-one track are both covered with a single light spot, there occurs the effect of crosstalk to a large degree. For example, as shown in FIG. 12, when the light spot is focused on one layer 16 of two recording layers in an optical disk having two layers therein and the reproducing is performed there, a condition may occur as a result of the light spot intercepting the other layer 15. The reason for this is that, since the light spot is not focused on the layer 15, the light spot is out of focus and becomes considerably large; and, therefore, the reading operation is affected by the plural tracks simultaneously. In this case, the ID or address data part aligned in a radial direction will come under a single light spot simultaneously and the effect of the ID or address part data becomes extremely large. Therefore, the extension of the technology to a two-layer recording medium has been substantially impossible.

SUMMARY OF THE INVENTION

It is an object of the present invention to provide a recording format for an optical disk that solves the above-mentioned problem and that can easily be applied to a two-layer recording medium.

The following means (or configurations) are used to achieve the object of this invention.

(1) An optical disk having at least one or more information recording layers therein is configured in such a way that there are provided at least a plurality of spiral information tracks each corresponding to one rotation of the disk on the information recording layer, a plurality of information recording units are arranged on the said plurality of tracks, any two of the information recording units that are arranged on all the tracks located in a doughnut region demarcated by two concentric circles with a spacing of 5 μm in a radial direction are arranged such that their top ends are separated by at least 5 μm or more in the circumferential direction. In this configuration, the information tracks, each specified as being wobbled in a radial direction with an almost constant frequency, are used and the amplitude of the wobble is specified to be constant in a radial direction. More preferably, the wobble and the recording unit are arranged in synchronization with each other.

Thanks to this format, even when the recorded region and unrecorded region exist together on the recording layer, any recording units existing in the tracks located in the doughnut region demarcated by the concentric circles with a spacing of 5 μm do not come into alignment to each other in the circumferential direction; and, therefore, when the defocussed light spot moves in the circumferential direction, the light spot will not move from the recorded regions to non-recorded regions or vice versa over a plurality of tracks simultaneously. Therefore, the reproduced signal and the servo signal, which are obtained by the reflected light of the light spot, do not suffer abrupt changes.

In an optical disk having therein a plurality of recording layers that can be accessed from one side of the disk, when one of the layers (a first layer) is being recorded/reproduced, the light spot is defocused (out of focus) on the second layer (with a recording format according to the present invention) to a degree corresponding to the amount of the layer spacing. The size of this defocused light spot is proportional to the layer spacing, and it is common that the size is set to be, for example, 10 times the spot size (0.5–1 $\mu$m) that was focused to the diffraction limit of light or more, in consideration of the effect of the inter-layer crosstalk. Therefore, the size of the light spot on the second layer that is not a target layer of recording/reproducing becomes 5 $\mu$m or more. Therefore, according to the present invention, the recording unit regions in the tracks located in the doughnut region demarcated by the two concentric circles with a spacing of 5 $\mu$m are arranged such that their top ends are shifted by 5 $\mu$m or more. This configuration eliminates a fear that the second layer would exert the effect of rapid change on the reflected light and the transmitted light of the light spot.

This mechanism will be described with reference to FIGS. 5A and 5B. FIG. 5A shows the conventional example where the top ends of the recording unit regions (recording units) are aligned in the circumferential direction over a plurality of tracks 11; FIG. 5B shows an example according to the present invention where the top ends of the recording unit regions (recording units) are not aligned in the circumferential direction. Therefore, in the conventional example of FIG. 5A, when the light spot 21 moves from an area where there exist many recording unit regions 13 on which data has been recorded to an area where non-recorded parts are the great majority, there occurs a large change in the reflectance and the transmittance for the whole of the light spot. On the other hand, in the example of FIG. 5B, since there is no occurrence of simultaneous transitions from the recorded regions to unrecorded regions on the tracks under the light spot when the whole of the light spot is considered, the reflectance and the transmittance hardly shows any changes at all. Therefore, a fear that this second layer would exert the effect of rapid change on the reflected light and the transmitted light of the light spot is eliminated, and, consequently, a fear that, due to the inter-layer effect in the multilayer recordable type disk, the quality of the reproduced signal would deteriorate is also eliminated.

The effect of this technique is not limited to a two-layer recording medium. In the single-layer disk as well, the reproducing is conducted with a defocused light spot before the focusing servo unit is in operation. Based on the reflected light of this defocused light spot, an error signal for the auto focusing is obtained, but if there occurs a rapid change, as in the case of FIG. 5A, the focusing servo unit cannot perform well in finding a best focus or it may give a focus offset, hence causing instability in the servo control. According to the present invention, stabilization of a servomechanism is achieved. This stabilizing effect in the servomechanism is effective with respect to a multilayer disk as well.

In this case, by forming the wobble in the information tracks, the timing of reproducing the recorded region can be obtained accurately, and, therefore, when accessing the recorded region, the top end of the recorded region that is shifted in the circumferential direction can be found easily and synchronization therewith can be achieved in a very short time. By setting the wobbles that are adjacent to one another in a radial direction such that their phases are almost equal to one another, even when the recorded region is accessed over the tracks in a radial direction, it is not necessary to achieve synchronization with the wobble or resynchronization can be achieved very quickly. Further, since the frequency of the wobble is almost constant and the geometric loci of the wobbles are in-phase/in-phase in a radial direction, the distance between the information tracks in a radial direction are kept almost constant; therefore, a fear that the wobble would affect the recording/reproducing characteristics is eliminated.

As an additional effect, there is an improvement of the multiple overwriting characteristics. In this regard, it is commonly known that, when overwriting is repeated a number of times in an overwritable type disk, distortion is accumulated at a leader and a trailer of the recorded region. With a format in which the top ends of the recording unit regions are not aligned over a plurality of tracks as specified by the present invention, the effects of the distortion in the leader and the trailer do not center at a single position, but are dispersed and averaged, and therefore, the multiple overwriting characteristics are improved.

(2) An optical disk having at least one or more information recording layers therein is configured in such a way that there are provided at least a plurality of spiral information tracks, each corresponding to one rotation of the disk on the said information recording layer, a plurality of information recording units are arranged on the said plurality of tracks, and an integer multiple of the length of the said information recording unit is different from the length of the track corresponding to one rotation of the optical disk by at least 5 $\mu$m or more.

Since the information tracks are configured in a spiral form, a point that moves from the top end of a certain track (referred to as a first track) by the amount corresponding to one rotation of the disk will reach the top end of another track (referred to as a second track). Needless to say, the first and second tracks are close to each other by within 5 $\mu$m in a radial direction. Note that the first and second tracks are not necessarily adjacent tracks. For example, in the case where the information tracks are composed of groove tracks and land tracks (land-and-groove structure) as indicated in the later-described section (7) and thereafter, a continues spiral structure that is made up of contiguous tracks is not necessarily a single spiral. More particularly, if the groove tracks are configured such that one groove track is connected to the next groove track after one rotation of the disk and the land tracks are configured such that one land track is connected to the next land track after one rotation of the disk, the disk has a structure of two spirals that consists of one spiral made up of a series of tracks on the land and another spiral made up of a series of tracks on the groove. This particular structure is generally called a double spiral. In this case, if the above-mentioned first track is on the groove, the second track is also on the groove, but there is a land track between these two groove tracks, and, therefore, the first and second tracks are not the adjacent tracks. The recording unit regions are arranged without spacing from the first track to the second track and so on. Since an integer multiple of this recording unit region does not agree with the length of the track, the locations of the top ends of the information recording units on the first track and on the second track are shifted in the circumferential direction. Because of this mechanism, virtually the same arrangement of the recording unit regions as that of the above-mentioned section (1) is realized and the same effect is achieved.

(3) An optical disk is configured in such a way that, among a combination of two integers N and M, such that the integer N times the length of the above-mentioned information recording unit agrees with the integer M times the length of the above-mentioned track, a minimum combination of N and M (referred to as "n and m") is found and the integer m is more than 5.

By this configuration, the top ends of the information recording units on the tracks that are formed continuously in the form of a spiral, similarly to that of the above-mentioned section (2) do not coincide with one another in the circumferential direction for m tracks. Here, assuming that the tracks are of the land and groove structure and the width of the track is approximately 0.5 $\mu$m, a fact that m is 5 or more indicates that the disk can be configured such that the top ends of the recording units do not agree with one another in the circumferential direction over a radial range of 0.5×2× 5=5 $\mu$m or more. (In this case, it is necessary to configure the recording unit regions on the land track and the recording units on the groove track so that they are shifted from each other.) Therefore, as a result, the configuration is the same as that of section (1) and the effect is also the same.

(4) An optical disk that has at least one or more information recording layers and has a plurality of spiral tracks, each consisting of a groove and/or a land, and each corresponding to one rotation of the disk on the said information recording layer, is configured in such a way that the said track is formed so as to be wobbled in a radial direction, there exists an integer j such that the integer j times the length of the said wobble agrees with the length of one track, the length of the information recording unit arranged on the track is equal to k times the period of the said wobble, and representing a least a common multiple of the integers j and k as L, the integer L is set to 5 times the integer j or more.

This agrees with the feature of above-mentioned section (3) and, consequentially, with respect to a relation between the information recording unit and the track. That is, since the least common multiple of the integers j and k is L, L=k×n and L=j×m and the integers n and m are coprime to each other. In other words, the integers n and m are a minimum combination of a combination of N and M such that integer N times the length k of the information recording unit agrees with integer M times the length j of the track.

Since in this means the information tracks are constructed so as to be wobbled and the length of the information recording unit and the length of the track are each specified so as to be an integer multiple of the wobble in addition to the feature of above-mentioned section (3), it becomes easy to achieve synchronization with the information recording unit, the track, and finally the recording information itself using the periodic signal obtained from the wobble. Moreover, since one rotation of the track is composed of integer pieces of wobbles, the wobbles are in phase between the adjacent tracks; and, therefore, a stable wobble signal can be obtained, and there is no adverse effect against the reproduced signal.

(5) An optical disk having at least one or more information recording layers therein is configured in such a way that there are provided at least a plurality of spiral information tracks, each corresponding to one rotation of the disk on the said information recording layer. There are provided plural pieces of address data on the said track, any two of pieces of the ID or address data that are arranged on all the tracks located in a doughnut region demarcated by two concentric circles with a spacing of 5 $\mu$m in a radial direction are arranged such that their top ends are separated by 5 $\mu$m or more in the circumferential direction.

By virtue of this configuration, since pieces of the recording address data are not aligned mutually in the circumferential direction for tracks existing in the range of a radial increment of 5 $\mu$m, the effects of defocused pieces of address data for a plurality of the tracks are not received simultaneously; and, consequently, the reproduced signal and the servo signal both obtained from the reflected light of the light spot, do not suffer abrupt changes.

In the optical disk having a plurality of recording layers that can be accessed from one side of the disk, when one of the layers (a first layer) is being recorded/reproduced, the light spot is defocused (out of focus) on the second layer (with a format according to the present invention), to a degree corresponding to the spacing between the layers. The size of this defocused light spot is proportional to the spacing between the layers, and it is common that the size of the defocused light spot is set to be 10 times the spot size (0.5–1 $\mu$m) or more that is focused to the diffraction limit of light. Therefore, the size of the light spot on the second layer that is not a target layer of recording/reproducing becomes 5 $\mu$m or more. Therefore, by shifting the top ends of pieces of the address data on the track by 5 $\mu$m or more for tracks located in the range of a radial increment of 5 $\mu$m as specified by the present invention, a fear that this second layer would exert the effect of rapid change on the reflected light and the transmitted light is eliminated.

The effect of this feature is not limited to a two-layer recording medium. In the single-layer disk as well, the reproducing is performed with a defocused light spot before the focusing servo unit is in operation. Based on the reflected light of this defocused light spot, an error signal for the auto focusing is obtained, but if there occurs a rapid change as in the case of FIG. 5A, the focusing servo unit cannot perform well in finding a best focus or it may give a focus offset, hence causing instability in the servo operation. According to the present invention, stabilization of a servomechanism is achieved. This stabilizing effect in the servomechanism is effective with respect to a multilayer disk as well.

As an additional effect, the disk forming characteristics are improved. It is known that the disk substrate is normally formed by molding a thermoplastic resin, such as polycarbonate, in a mold, and that, if the embossed marks of the address data center in a part of the disk in the circumferential direction, the embossed marks cause adverse effect on a flow of the resin during molding. Therefore, there may exist a phenomena in which a molded track deforms or birefringency increases locally. If pieces of the address data are arranged so as not to be aligned for a plurality of tracks, as called for by the present invention, the effects of their distortions do not center at a single position, but are dispersed and averaged; consequently, the molding characteristics are improved and the tolerances of molding conditions are widened, and, accordingly, the manufacture of the disk becomes easy.

(6) An optical disk that has at least one or more information recording layers and has a plurality of spiral tracks, each consisting of a groove and/or a land and each corresponding to one rotation of the disk on the said information recording layer, is configured in such a way that the said tracks are wobbled in a radial direction. The address data arranged on the track is arranged so as to be separated from the address data of the adjacent track in the circumferential direction by the amount of an integer multiple of the wobble period.

Because of this configuration, pieces of the address data do not center at the same position in reference to the circumferential direction as is the case of the feature of the above-mentioned section (5), and therefore the same effect as the above-mentioned section (5) can be achieved.

Further, since the amount of the separation is an integer multiple of the wobble period, the top end of the recorded region that is shifted in the circumferential direction can be found easily, and synchronization can be achieved in a very short time. By setting the phases of the wobbles that are adjacent to each other in a radial direction, even when the recorded region is accessed over the tracks in a radial direction, it is not necessary to achieve synchronization with the wobble again, or resynchronization can be achieved very quickly. Further, since the frequency of the wobble is almost constant and the wobbles are in-phase in-phase in a radial direction or radially ajacent wobbles are in-phase, the distance between the information tracks in a radial direction is kept almost constant; and, consequently, a fear that the wobble would affect the recording/reproducing characteristics is eliminated.

Note that the phase of the wobble and the (top end) location of the recording unit region are in synchronization with each other, which is evident from the fact that the phase of the wobbles having approximately constant frequency are in-phase in-phase in a radial direction and the fact that the amount of the separation between the recording unit regions in the circumferential direction is an integer multiple of the wobble period.

Moreover, since the reproducing of the address data and the timing generation of the recording/reproducing can be performed using the wobble, reliable recording/reproducing can be performed stably. If the number of wobbles for one rotation of the track is chosen to be an integer number üian integer multiple of the wobble period being the length of one round of the trackuj, the phases of the wobbles are in-phase between the adjacent tracks, which is more preferable.

(7) Further, an optical disk is configured in such a way that the above-mentioned address data is formed in the form of embossed pits, and the embossed pits are arranged on an extension line of the boundary line between the groove track and the land track. A groove interrupted part is arranged on the embossed pit parts that are on four most adjacent tracks, including two tracks on whose boundary the embossed pits are arranged, in order that the groove does not exist there.

Because of this, the reproduction signal of the embossed pits of the ID or address data part can be reproduced free from the effect of the adjacent tracks, in addition to the effects of the above-mentioned sections (5) and (6); therefore, the quality of the reproduced signal of the embossed pits signal is improved, and this scheme is suitable for high-density recording. Moreover, since the embossed part and the groove can be made to not exist simultaneously, mastering can be carried out using a single beam in manufacturing a master (original record) for manufacturing a substrate; and, therefore, adjustment of the mastering apparatus is made easy. An example of application of this feature is shown in FIG. 1 and FIGS. 2A, 2B.

(8) An optical disk is, in addition to the feature of section (6), specified such that a region exists in which the groove is interrupted, the ID or address data is formed in the form of the embossed pits, and the embossed pits are arranged on the center line of the groove track at the interrupted part of the groove.

By this configuration, the quality of the reproduced signal of the embossed pits is improved in addition to the effects of the above-mentioned sections (5) and (6), and this configuration is suitable for high-density recording. Moreover, since the embossed part is on the extension line of the groove, the embossed pits can be formed as the presence and the absence of a groove; hence, a single beam is used to do the mastering in manufacturing the master (original disk) for manufacturing a substrate, and, consequently, adjustment of a mastering apparatus becomes easy and the disk manufacturing cost can be reduced. An example of application of this feature is shown in FIG. 13C.

(9) An optical disk is configured in such a way that the embossed pits are arranged also on the centerline of the land track; and, at a part of the groove track adjacent to a part of the land track where the embossed pits are arranged, the groove is interrupted.

By this configuration, the present invention can be applied to a land-and-groove type track, and, therefore, the configuration is suitable for high-density recording. An example of application of this feature is shown in FIGS. 13A and 13B.

(10) An optical disk is configured in such a way that the information recording units are arranged so as to be separated between the adjacent tracks in the circumferential direction, and the embossed pits representing all of or part of the address data are arranged so as to be aligned in a radial direction (at the same location with respect to the circumferential direction).

By this configuration, pieces of the ID or address data are arranged at the same location in the circumferential direction, and, therefore, rapid access to the recorded region is made easy. The information recording units are arranged so as to be separated from one another in the circumferential direction; and, therefore, the same effect as described in the above-mentioned section (1) can be obtained. When applying this feature, it is preferable that the length of the address data in the circumferential direction is not more than 3 $\mu$m or so and that the spacing of the address data is smaller than the length of the information recording unit.

More preferably the address data is divided into pieces of partial information whose length is not more than 3 $\mu$m or so, which are arranged so as to be dispersed in the circumferential direction with a spacing not less than 50 $\mu$m and not more than 1 mm. In this case, for example, one piece of partial information is chosen to represent information of one bit, and about 50 pieces of partial information are arranged so that one address data is composed thereof. By involving redundant information in the above-mentioned 50 pieces of partial information, the address data can be reproduced reliably and surely even when some of the pieces of the address data can not be reproduced due to defects etc. It is recommendable that the top end location of the information recording unit is arranged so as to be separated from that of the adjacent track in the circumferential direction by the amount of, for example, an integer multiple of the arrangement spacing of the above-mentioned partial ID or address data. Moreover, it is preferable that the track is wobbled as in the above-mentioned example to obtain timing of reproducing the ID or address data more surely. In that case, more preferably, the number of wobbles for one rotation of the track is chosen to be an integer multiple (an integer multiple of the wobble period being the length of one rotation of the track), because the the wobbles are in-phase/in-phase/in-phase between the adjacent tracks. An example of application of this feature is shown in FIG. 7 through FIG. 9.

(11) Moreover, an optical disk is configured in such a way that the optical disk has at least two or more information recording layers that can be accessed from one side of the disk, to which the features of the above-mentioned sections (1) through (10) are applied, and at least one recording layer is chosen to be a recordable type layer or an overwrite type layer.

By this configuration, a single sheet of the disk can store mass information as much as two times the information of the single-layer disk or more, and the signal crosstalk and disturbance between the signals from the information recording layers can be prevented by virtue of the effects described in sections (1) through (10). Therefore, a large-capacity optical disk that is surely a recordable type and has a multiple recording layers therein can be provided.

Other and further objects, features and advantages of the invention will appear more fully from the following description.

BRIEF DESCRIPTION OF THE DRAWINGS

A preferred form of the present invention is illustrated in the accompanying drawings, in which.

DETAILED DESCRIPTION OF THE PREFERRED EMBODIMENTS

Embodiment 1

Figure 1:
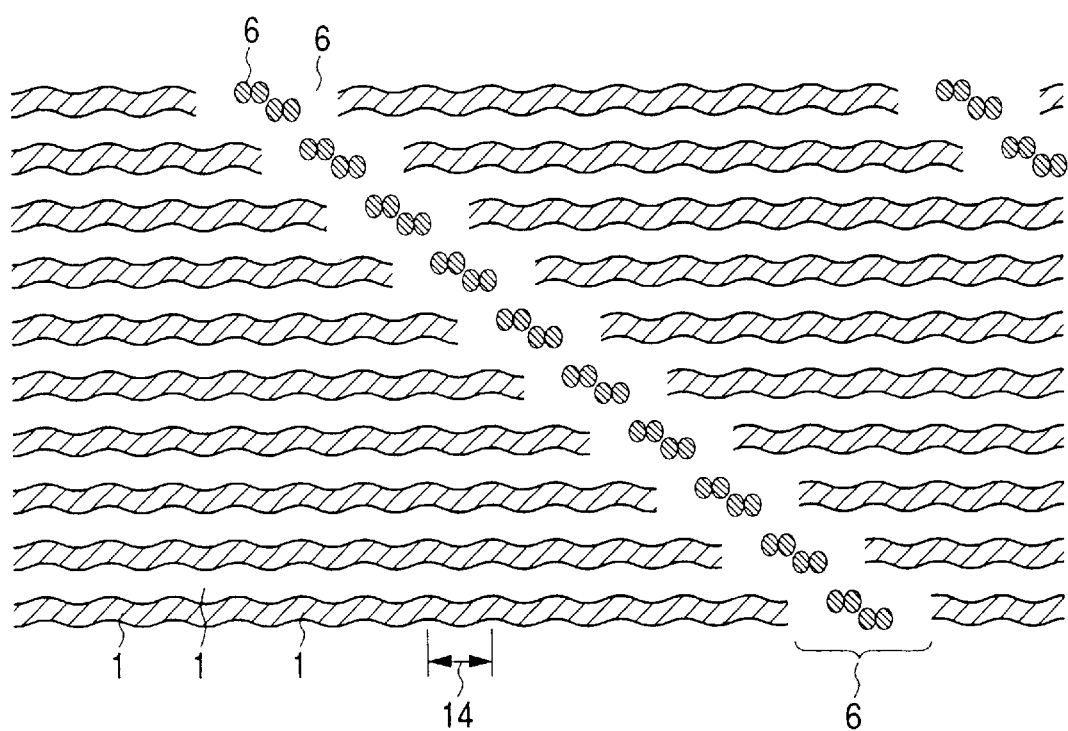
FIG. 1 is a schematic diagram of the track structure according to one embodiment of the present invention.

An enlarged partial view of the format of an optical disk according to the one embodiment of the present invention is shown in FIG. 1. The information track consists of a groove 11 and a land 12, each of which is formed in a spiral form on a disk-shaped substrate. The optical disk has a so-called double spiral structure in which any information track on the groove (land) connects to an information track on the groove (land) after making one rotation of the disk. Since FIG. 1 is an enlarged view of a portion of the spiral tracks, these tracks are depicted as almost straight lines with the inside in a radial direction being the upper side and the outside in a radial direction being the lower side in the figure.

The width of each track is 0.3 $\mu$m. The groove is a trench-like feature provided on the substrate, and the depth of the said groove is approximately 40 nm. Since this embodiment is intended to be recorded/reproduced with an optical head using a wavelength of about 400 nm with a numerical aperture of approximately 0.85, the depth of the groove, 40 nm, is approximately equal to an optical path length of one sixth wavelength. The groove is formed with its locus being wobbled in a radial direction with an amplitude of approximately 15 nmpp, and a period 141 of a wobble 14 is approximately 12 $\mu$m. This length of 12 $\mu$m is 186 times the channel bit length of the recorded information. Therefore, by multiplying the frequency of the wobble signal that is detected as a push-pull signal by a factor of 186, a clock that is usable for providing various timing can be generated.

Each track is divided by data segments 51 that constitute an information recording unit region. In this embodiment, one information recording unit 8 is composed of 8 data segments. One data segment is structured so as to have a length equivalent to 848 wobble periods. That is, one data segment is composed of 157728 channel bits, in which user data of as much as about 8 kilobytes can be recorded. The top end part of each data segment is allocated for a so-called mirror region 61 where the groove is interrupted, and in this mirror region 61 address information pits 63, that provide the ID or address data, are provided. The length of this groove interruption part (mirror region) is 8 times the wobble period, namely 1488 channel bits, which equals a length of approximately 96 $\mu$m. The length of the whole of the address pit part 63 is about four periods of the wobble, namely the length of 744 channel bits (48 $\mu$m), and the address pit part 63 is divided into two (first half and second half) regions.

In the groove track, the pits equal to two wobble periods of the first half address pit part (in the left of the figure) are arranged on its boundary bordering the inner adjacent land track (in the upper side of the figure); and, the pits equal to two wobble periods of the second half address pit part (in the right of the figure) are arranged on its boundary bordering the outer adjacent land track (in the lower side of the figure). Details of this address pit part are shown in enlarged dimension in FIG. 2A.

A groove interrupted part on a track that is the most adjacent outer track to the track in concern is arranged so as to be shifted backward by four wobble periods (in the right of the figure). The number of the wobbles for one rotation of the track is 12716 on the most inner circumference of the disk with a radius of about 24 mm. Therefore, when the data segment of as much as 848 wobbles are sequentially arranged, 15 data segments occupy one rotation of the track plus four wobbles; and, as a result, the ID or address data part on the outer groove is shifted backward by four wobble periods. A least common multiple of the number of the wobbles for one track (12716) and the number of the wobbles (6784) for one recording unit region (equal to 8 data segments) becomes 21566336, which corresponds to 1696 times the track length. That is, in 1696 consecutive groove tracks, there is no combination of the recording unit regions such that the top end of one recording unit agrees with the top end of the other recording unit.

Figure 2A:
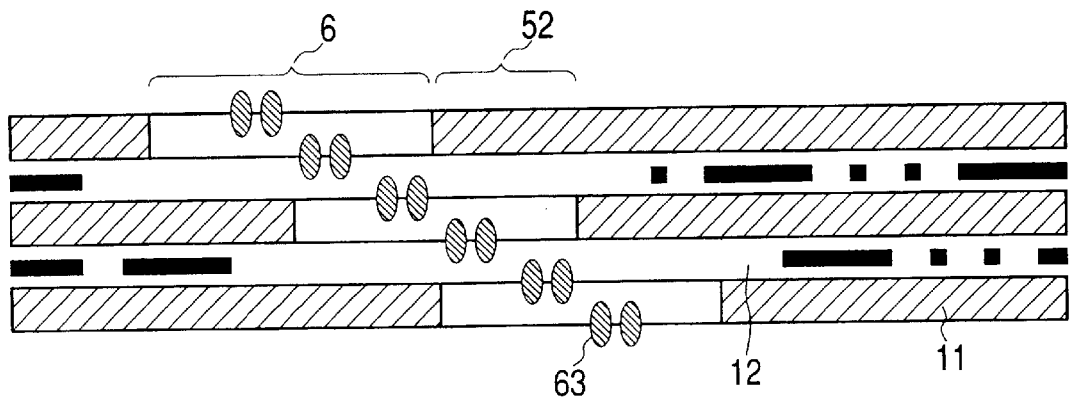
FIGS. 2A and 2B are diagrams showing a structure of the header field according to one embodiment of the present invention.

In FIG. 2A, also in the land track, the address pit part is arranged such that the pits of the first half address pit part are arranged on its boundary bordering the inner groove track, and the pits of the second half address pit part are arranged on its boundary bordering the outer groove track. Here, looking at the physical relationship of the land track and the inner adjacent groove track, the land track is shifted backward from the inner groove track by two wobble periods.

Figure 3:
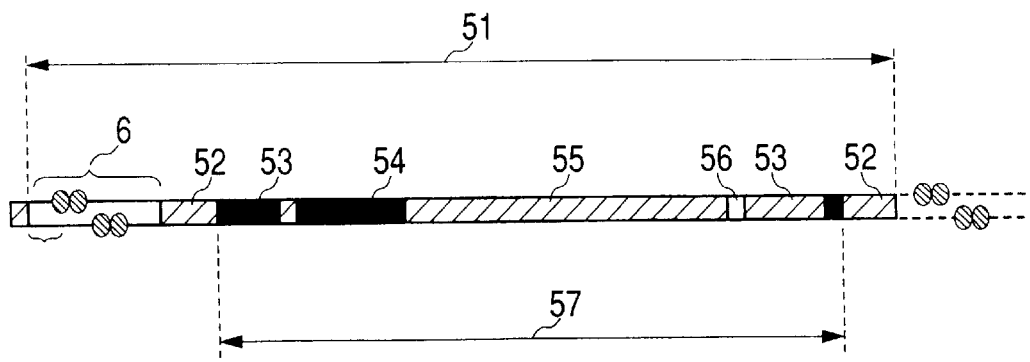
FIG. 3 is a diagram showing a structure of the data segment according to one embodiment of the present invention.

In the groove, an information recording part 57 is configured so as to start at a spacing from the rear end of the mirror part of two wobble periods and to end at a spacing from the top end of the mirror part of two wobble periods. That is, gap parts 52 are arranged in front and at the rear of the mirror part, as seen in FIG. 3. The length from the rear end of the address pits to the information recording part 57 is equal to four wobble periods. The relation between the information recording part and the address pits stands also in the land similarly. With this configuration, the recording part on the land is limited to a part having a physical groove on both sides thereof; and, therefore, the reproducing characteristics are free from any fear that the reproducing would be affected by the presence and absence of the physical groove.

In FIG. 2A, as described above, the lengths of the first half and of the second half of the address pit region are equal to two wobble periods, namely approximately 372 channel bits, and among these 372 bits, the foremost and backmost parts, each equal to 11 channel bits, are so-called buffer fields (gap fields) where no pits exist. Accordingly, 350 channel bits are used for representing the address information. This address information consists of the address data of 32 bits, parity bits (CRC) of 16 bits, and a postamble. One bit corresponds to the length of four channel bits. Since the address information is composed of the 8/16 transform code where the length of one address channel bit equals the length of two channel bits in this embodiment, the above-mentioned 32 bits plus 16 bit data occupies 192 channel bits (namely, four channel bits for one bit), and among the remainder bits, 128 channel bits are used for synchronization information and 32 channel bits are used for the postamble. Since the length of one address channel bit is the length for two channel bits, the shortest mark length becomes six channel bits (equal to approximately 0.4 $\mu$m), which is comparable to the size of the light spot. Therefore, the following advantages are achieved: the shortest mark can be detected with an extreme tolerance; and, also in conducting the mastering, the master can be manufactured using the same light spot as one for forming the track, with an extreme tolerance. Synchronization information is composed of three times the repetition of a pair of a mark and a space of 12 channel bit length, a mark of a 42 channel bit length, and a space of a four channel bit length. For a clock signal for reproducing this signal, a clock signal obtained from the wobble can be used.

The clock signal that was obtained from the wobble is used to provide timing for reading the address information at the time of reproducing or accessing the recording region etc. as well as for reproduction. For example, in accessing the recorded region or the like, it is possible that the top end of the recorded region that is shifted in the circumferential direction is found easily and the synchronization therewith is achieved in a very short time.

Further, in the configuration of this embodiment, since the wobbles adjacent in a radial direction are provided with almost the same phase, even when accessing the recorded region across the tracks in a radial direction, there is no need to achieve synchronization with the wobble again, or resynchronization can be achieved very quickly. Moreover, since the frequency of the wobble is almost constant and the wobbles are in-phase/in-phase/in-phase in a radial direction, the distance between the information tracks in a radial direction is kept almost constant; and, consequently, a fear that the wobble would affect the recording/reproducing characteristics is eliminated.

Figure 4:
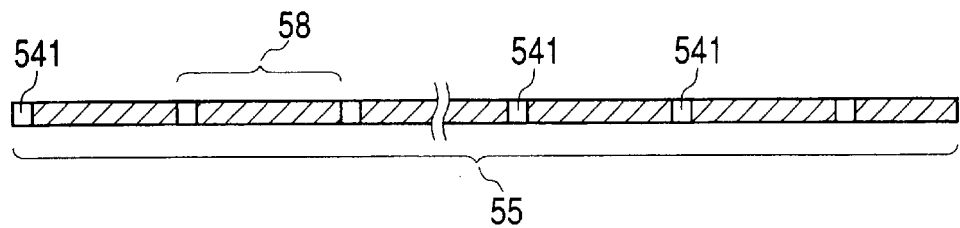
FIG. 4 is a diagram showing an example of the data field according to one embodiment of the present invention.
Figure 5A:
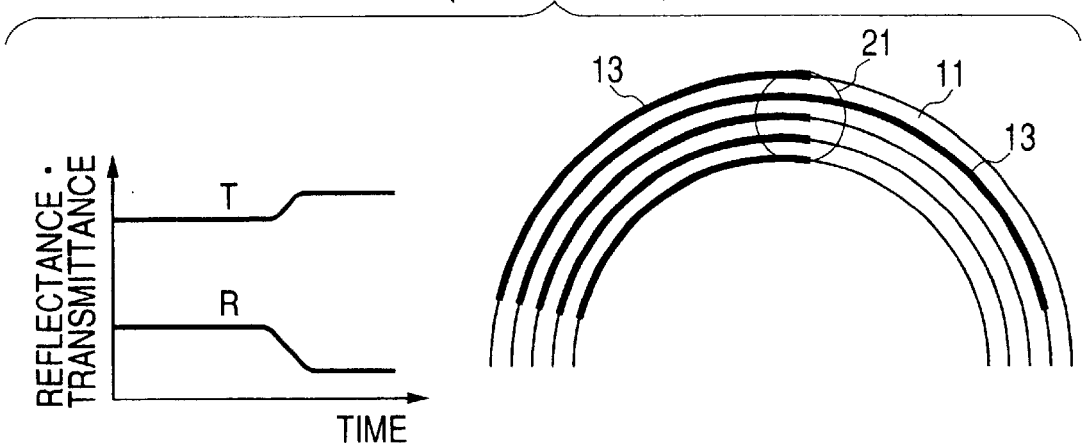
FIGS. 5A and 5B are diagrams illustrating an object and a principle of the invention.
Figure 5B:
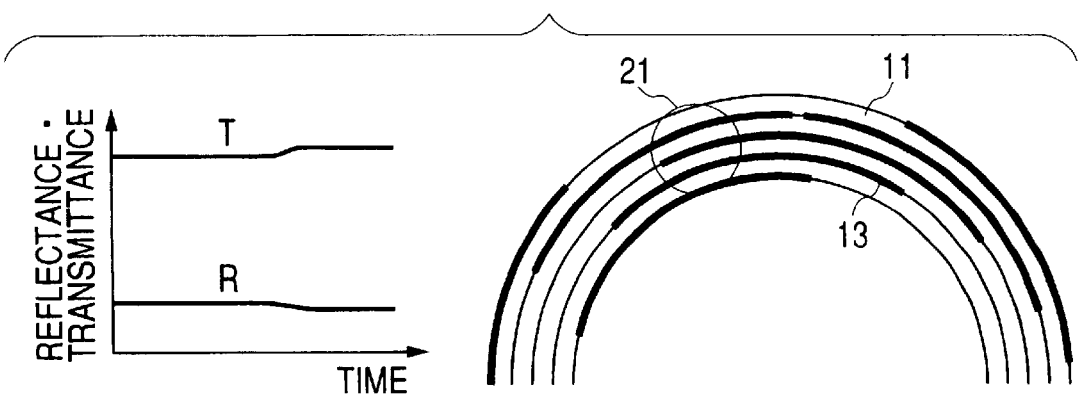

Details of the recording part 57 are shown in FIG. 3. After the gap parts are provided in front and at the rear of the recording part anterior to the recording, the data is recorded in the following order: a guard field 53, a synchronization signal region 54, a data field 55, a postamble 56, and a guard field 53, in order to protect the data against repeated overwriting. The guard part is not used for reproduction in consideration of deterioration of the signals, but a specific pattern or a random pattern is recorded there. The total length of the two guard fields 53, the synchronization signal region 54, and the postamble region 56 are designed to be 2 wobble periods, namely 372 channel bits. With this, the length of the data field 55 can be secured to be 832 wobble periods. The data field 55, as shown in FIG. 4, is divided into data frames 58, each having the length of 8 wobble periods, and at the top end of each data frame, a resynchronization (SY) region 541 of a 32 channel bit length is arranged.

In this example, the user data is recorded using the 8/16 modulation code; and, accordingly, the data frame of 8 wobble periods corresponds to a 93 byte length, and this means that data of 93 bytes can be recorded for one data frame, excluding the SY field 541. Since one segment includes 104 data frames, 832 data frames are recorded per recording unit region. That is, 75712 bytes are recorded per recording unit region. However, for practical recording, it is assumed that errors arise from defects etc. and an error correction code is added to the recording unit region. In this example, 64 kilobytes out of the 75712 bytes are used for the user data, and the remainder is allocated to the error correction code etc.

Figure 11:
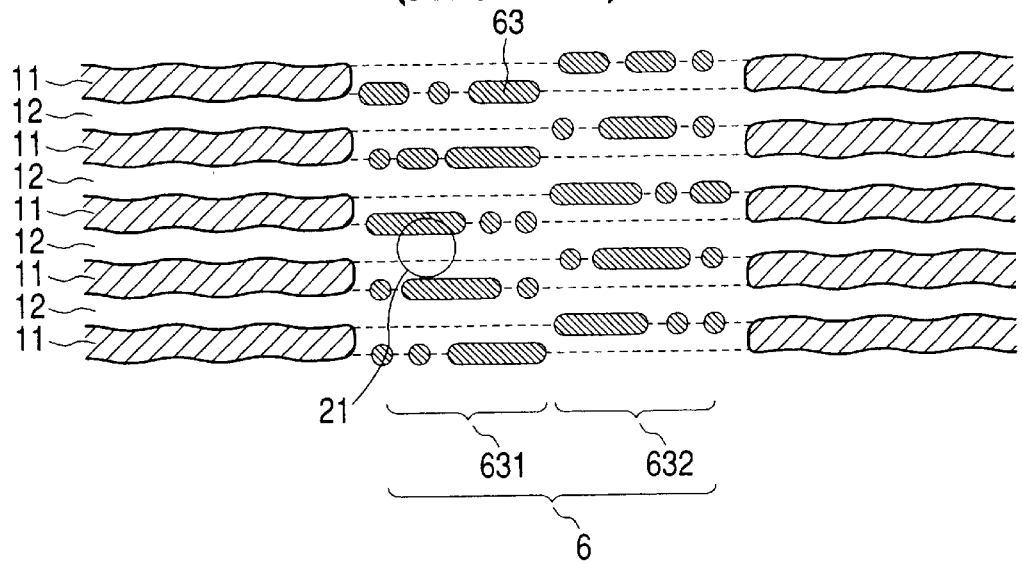
FIG. 11 is a schematic diagram of a track structure of a conventional optical disk.
Figure 12:
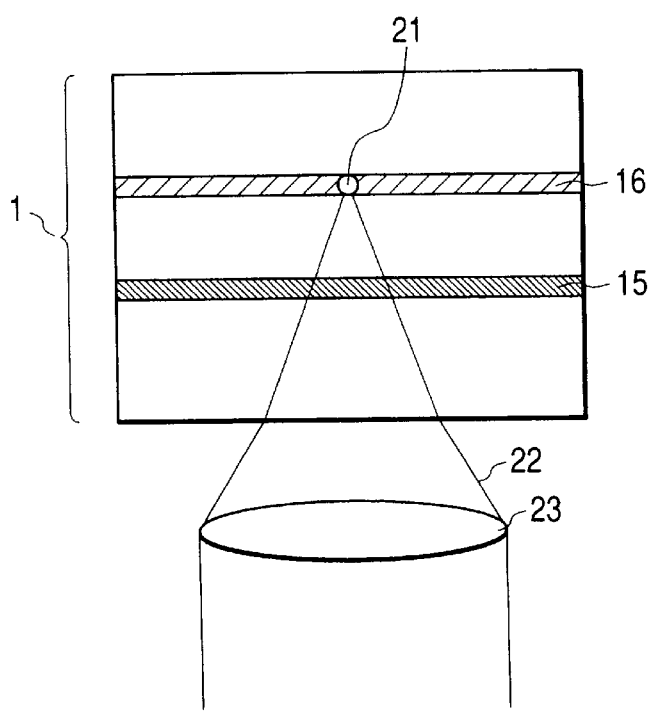
FIG. 12 is a diagram showing an example of recording/reproducing of a multilayer optical disk.

An optical disk (FIG. 12) that has therein two recording layers each having the above-mentioned recording format was manufactured. For the recording layers 16 and 15, a phase change type recording layer of a GeSbTe compound is used, and the transmittance of the recording layer 15 is set to about 65% so as to allow the light pass therethrough. The recording was conducted at random in a plurality of recorded regions on the lower layer 15 of the two-layer disk according to this embodiment using the apparatus according to the seventh embodiment, and the reproducing characteristics of the upper layer 16 were evaluated. It was verified that the reproducing characteristics exhibited almost no change before and after the recording on the layer 15. For both cases, jitter values of about 9% were obtained. On the other hand, in carrying out the same experiment with the conventional format as shown in FIG. 11, at the time when the optical disk of the two-layer structure was installed, the signal level varied by about 10% due to the effect of the ID or address data part, and, as a result, the average jitter value increased to 10% from 9%. Moreover, when carrying out random recording with this disk, the jitter value actually recorded 13% or more in the worst zone. In fact, it is inferred that, because of rapid level fluctuation, a function of auto slice control did not work normally, resulting in a high jitter value. In the worst zone, it was found that the number of the recording units on one rotation of the track was exactly two and the top ends of the recording units were aligned in a line for all the tracks in the zone.

The phase of the wobble and the top end location of the recording unit region are in synchronization, as is evident from the fact that the phases of the wobbles having approximately constant frequency are aligned in a radial direction and the fact that the amount of separation between the recording unit regions in the circumferential direction is an integer multiple of the wobble period.

Embodiment 2

Figure 2B:
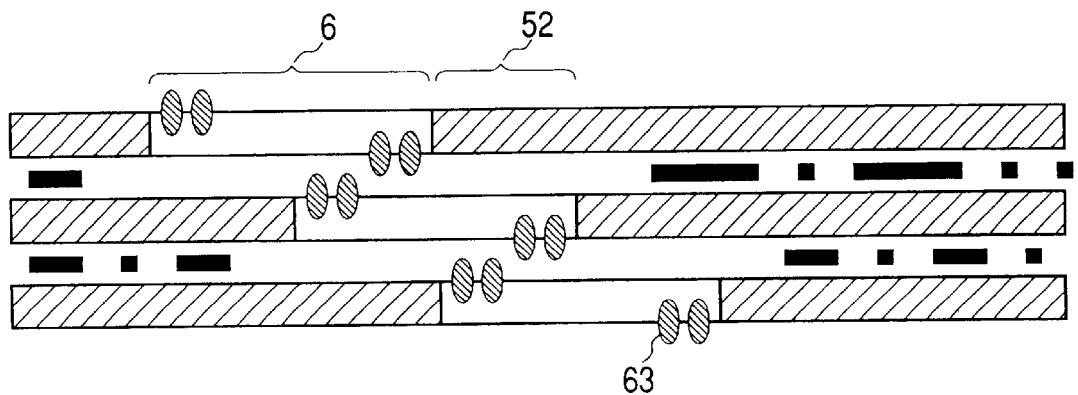

A further embodiment according to the present invention is shown in FIG. 2B.

The second embodiment is the same as the first embodiment except for the arrangement of the address pits in the header part. In the present embodiment, there is a mirror part corresponding to four wobble periods between a first half part and a second half part of the address pits. In the land, there is no large mirror part between the first half part and the second half part of the address pits, but the mirror is arranged in front of and at the rear of the address pit part. In the present embodiment, since timing polarities of address emergence in the groove and in the land are different, a judgment of the land and the groove can easily be conducted using this fact.

Embodiment 3

Figure 13A:
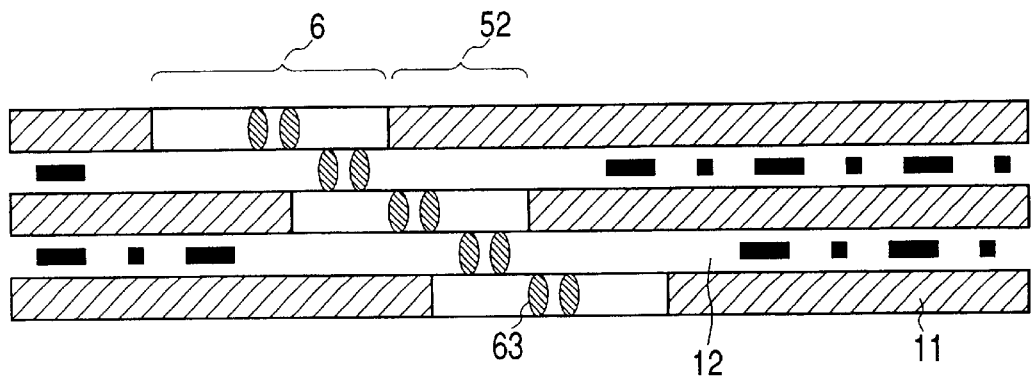
FIGS. 13A, 13B, and 13C are diagrams showing the structure of the header field according to one embodiment of the present invention.

A further embodiment according to the present invention is shown in FIG. 13A.

The third embodiment is different from the first embodiment with respect to the arrangement of the address pits of the header part and the amount of shifting of the header part for one rotation of the track.

Embodiment 4

Figure 13B:
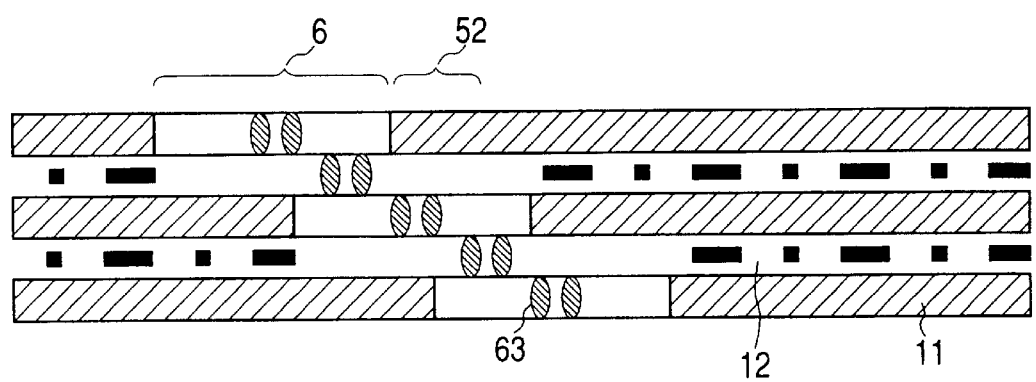

A further embodiment according to the present invention is shown in FIG. 13B.

The fourth embodiment is basically the same as the third embodiment, but the lengths of the gap parts 52 in front and at the rear of the recording part is different.

Embodiment 5

Figure 13C:
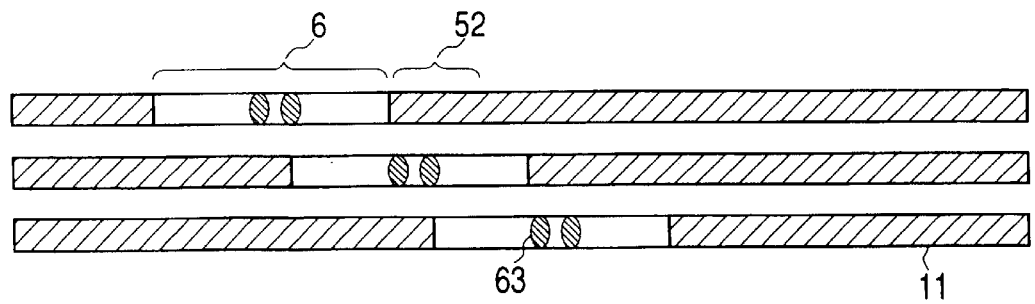

A further embodiment according to the present invention is shown in FIG. 13C.

In this embodiment, the recording is performed only on the groove track. Therefore, the address pits 63 do not exist in the land. Other structural features than this are the same as the fourth embodiment. The figure is provided only for showing the arrangement of the header part. In the figure, it might be seen that the wobble is not formed in the groove, but actually the groove is formed with its locus being wobbled as shown in FIG. 1, and the wobble signal can be obtained as a push-pull signal.

Embodiment 6

In this embodiment, the recording units are arranged so as to be separated from one another in the circumferential direction between adjacent tracks, and the embossed pits representing all of or part of the address data are arranged so as to be aligned in a radial direction (at the same location in the circumferential direction).

Figure 7:
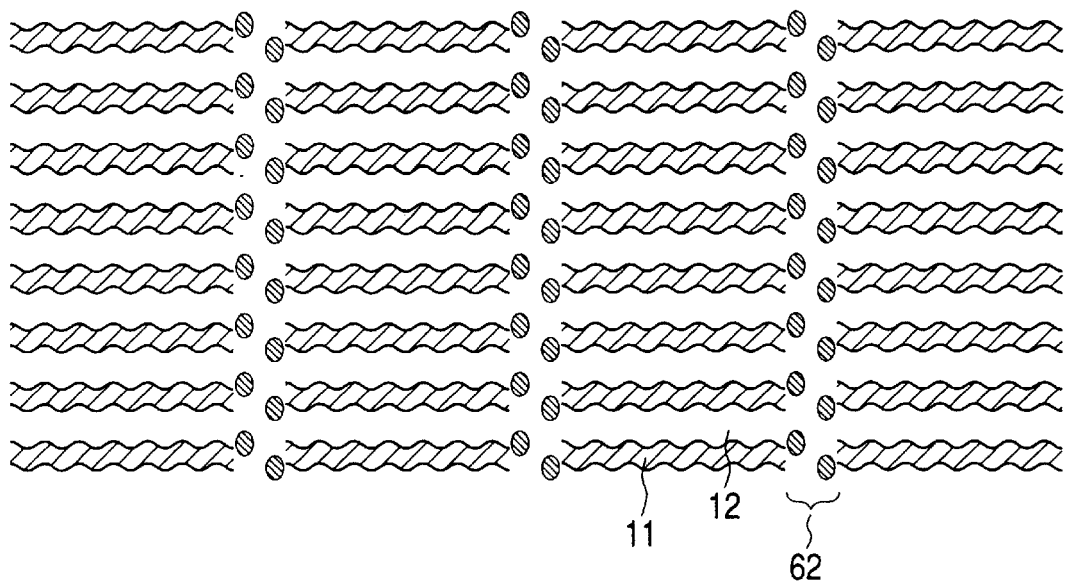
FIG. 7 is a schematic diagram of a track structure according to one embodiment of the present invention.
Figure 8:
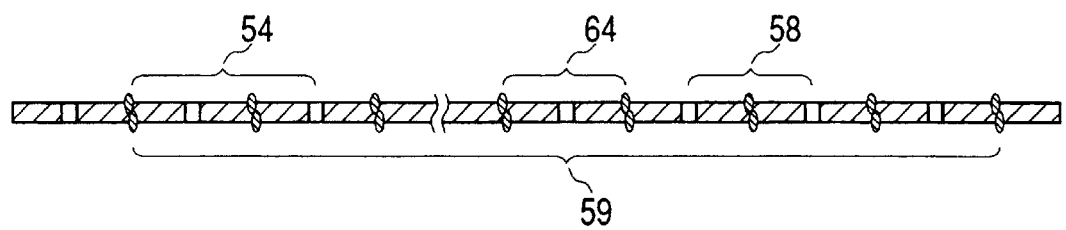
FIG. 8 is a diagram showing the structure of a recording unit according to one embodiment of the present invention.
Figure 9:
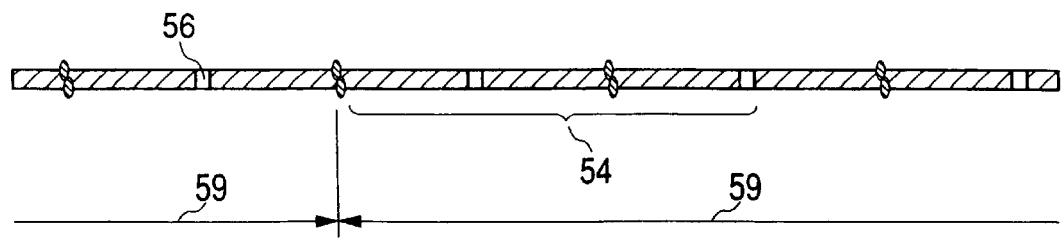
FIG. 9 is a diagram showing the structure of a linking region and its vicinity according to one embodiment of the present invention.

As a result, the ID or address data is arranged at the same location in the circumferential direction, as shown in FIG. 7. Therefore, high-speed access becomes easy. However, the information recording units themselves are not in synchronization with the address data, as shown in FIG. 8, and are arranged so as to be separated in the circumferential direction for respective tracks. Therefore, basically the same effect as the first embodiment can be achieved. The address data is arranged so as to be dispersed to a plurality of regions. The length of a pit 62 in the circumferential direction that represents one partial information is about 3 bytes, that is, about 3 μm, and the spacing of the partial information parts, namely a physical frame, is 96 bytes, that is, about 100 μm. One piece of the partial information is specified to represent information of one bit, and 104 pieces of the partial information are arranged so as to constitute one piece of the address data. The address data composed of 104 pieces of the above-mentioned partial information consists of the synchronization information of 16 bits, the address information of 32 bits, and error correction information of 56 bits. By this error detection information, even when part of the address data cannot be reproduced due to defects etc., the address data can be reproduced reliably and surely. The information recording unit was arranged such that its top end location is separated from those on the adjacent tracks in the circumferential direction by the amount of the arrangement spacing of the above-mentioned partial address data. Moreover, in order to obtain the timing of reproducing the ID or address data more surely, the track is formed with its locus being wobbled, as in the above-mentioned example, so that there are eight wobbles for the above-mentioned one physical frame. Naturally, since the number of wobbles for one rotation of the track is an integer, it stands to reason that the phases of the wobbles are in-phase/in-phase among the adjacent tracks. FIG. 9 shows the structure of a connection part in the recording unit region.

Embodiment 7

One example of a light recording system according to the present invention will be described with reference to FIG. 6.

Figure 6:
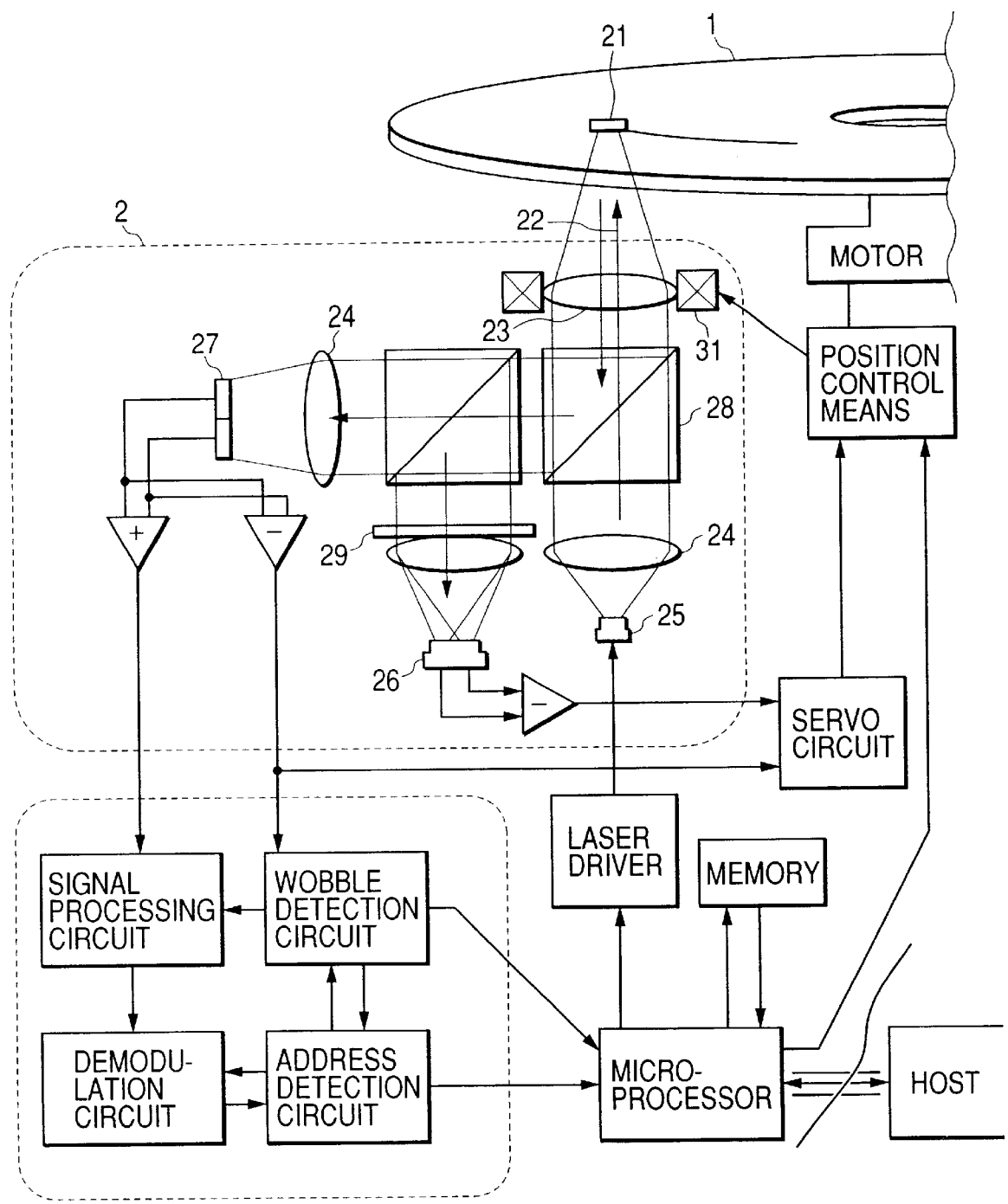
FIG. 6 is a block diagram of one embodiment of a device according to the present invention.

FIG. 6 is a block diagram of the optical recording system that uses an optical recording format according to the present invention. Light emitted from a laser 25 (in this embodiment, the wavelength: approximately 405 nm) that is part of a head 2 is collimated by a collimating lens 24, which forms an almost collimated light beam 22. The light beam 22 is irradiated on an optical disk 11 through an objective lens 23, forming a spot 21. Also, the light beam 22 is guided to a servo detector 26 and a signal detector 27 through a beam splitter 28, a hologram element 29, etc. Signals from the detector are processed for addition and subtraction to yield servo signals, such as a tracking error signal and a focus error signal, which are inputted to the servo circuit. The servo circuit controls the positions of an objective lens 31 and of the whole optical head 2 depending on the tracking error signal and the focus error signal obtained, so that the position of the light spot 21 is set on a target recording/reproducing region.

An addition signal of the detector 27 is inputted to a signal reproduction block 41. The input signal undergoes filtering and frequency equalizing, and is then digitized. The digital signal that has been digitized is processed by an address detector and a demodulation circuit. The groove (meaning "in the groove part") wobble information is detected as a differential signal from the split detector 27 and is inputted to a wobble detection circuit in the signal reproduction block 41. The wobble detection circuit binarizes and multiples the wobble signal to generate a wobble clock signal, which is used as a reference in processing the signal or to create the timing in a signal processing unit and the address detector.

Embodiment 8

Figure 10:
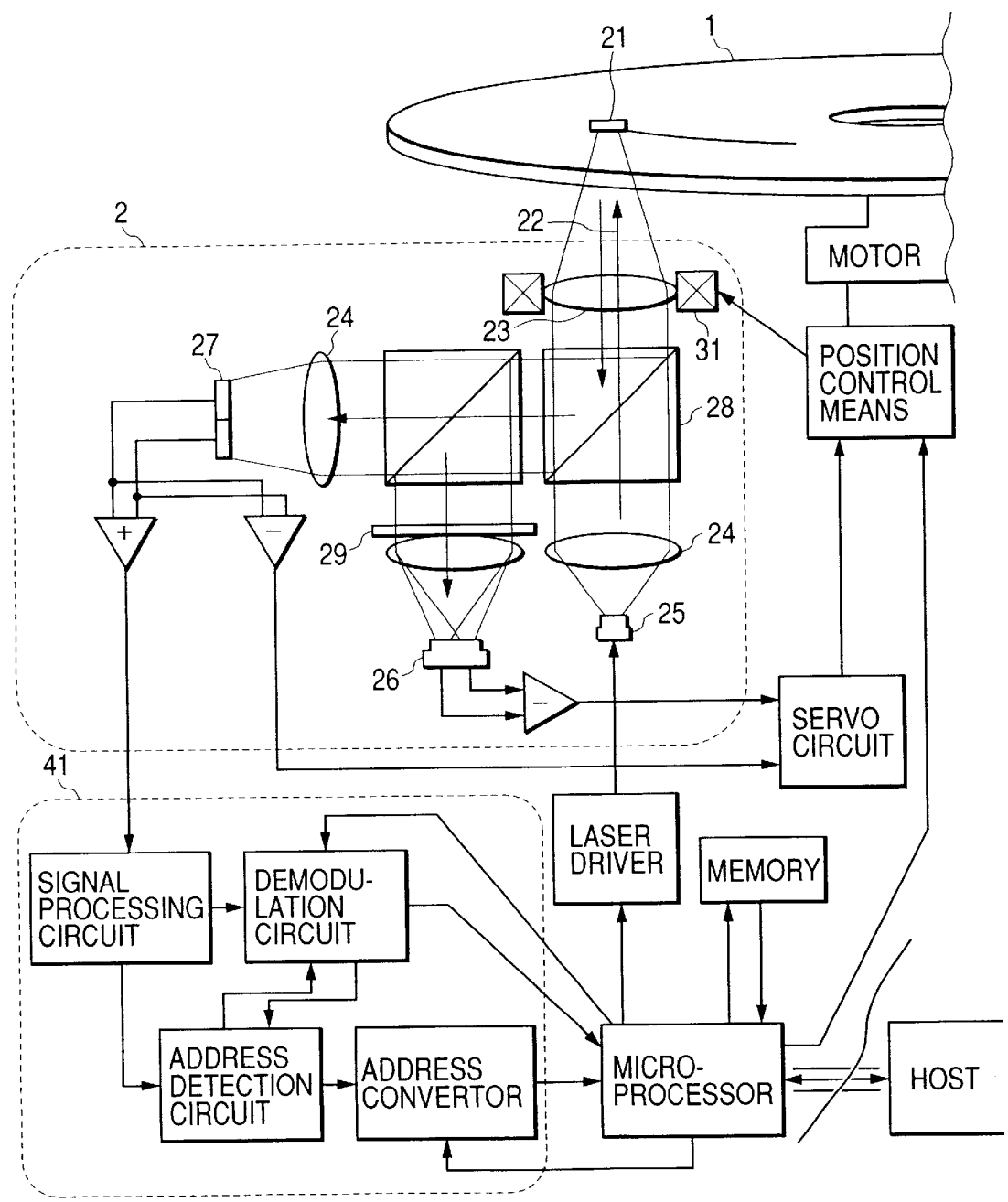
FIG. 10 is a block diagram of one embodiment of a device according to the present invention.

A block diagram of an apparatus for recording/reproducing the recording medium according to the sixth embodiment of the present invention is shown in FIG. 10. The eighth embodiment is basically the same as the apparatus according to the seventh embodiment but an address conversion circuit is added to the seventh embodiment because the physical address represented by the ID or address data does not correspond to the physical location of the actual recording unit on a one-to-one basis.

The effect of the present invention is not limited to the above-mentioned embodiments. For example, as the wavelength of the laser to be used for the recording/reproducing, a wavelength in a range of 630–650 nm may be used.

Moreover, the numerical aperture of the head may be 0.65 or 0.75. The modulation scheme of the record signal is not limited to the 8/16 modulation code. For example, the (1,7) modulation or the 8/15 modulation may be used. The recording material is not limited to a phase-change type material, and, for example, the present invention may be applied to a write-once type recording layer of a dye material.

With the recording format for the optical disk according to the present invention, in a so-called multilayer optical disk that has two or more recording layers and with which recording and reproducing is performed by changing the focus position to select one of the layers, the effect from a layer that is not selected can be reduced significantly, and, therefore, multilayer recording/reproducing can be realized in the recordable type optical disk.

The effect of the recording format according to the present invention is not limited to the multilayer recording. In a disk having a single recording layer as well, there are an effect that the influence of the crosstalk from the adjacent recorded region and the address data is reduced, and an effect that the servo signal is stabilized. Moreover, since pieces of the ID or address data do not center at the same position in reference to the circumferential direction, the effect of distortion that is generated on the disk substrate and the recording layer at the time of optical disk formation or multiple overwriting can be minimized, and tolerances of the optical disk in the design and manufacture thereof are extended. As a result, the media can be provided with a low cost. Furthermore, with the recording format according to the present invention, it becomes possible to construct an optical recording/reproducing system that is easy to be expanded from the single-layer scheme to the two-layer scheme. Moreover, in a disk where the recordable type recording layer and a reproduction-only type recording layer exist together therein, the interference between such recording layers can be minimized. Therefore, there is an effect that the quality of the reproduced signal is improved.

The foregoing invention has been described in terms of preferred embodiments. However, those skilled in the art will recognize that many variations of such embodiments exist. Such variations are intended to be within the scope of the present invention and the appended claims.

What is claimed is:

1. An optical disk that has at least one or more information recording layer therein, wherein there are provided a plurality of spiral information tracks each corresponding to one rotation of the disk on said information recording layer, said information track is wobbled in a radial direction of said optical disk, phases of said wobbles are almost in-phase between adjacent tracks, a plurality of information recording units are arranged on said plurality of tracks, and any two of the information recording units that are arranged on all the information tracks located in a doughnut region demarcated by two concentric circles with a spacing of 5 $\mu$m in a radial direction of said optical disk are arranged such that their top ends are shifted in the circumferential direction.

2. An optical disk according to claim 1, wherein said information recording units are arranged such that their top ends are separated by 5 $\mu$m or more in the circumferential direction.

3. An optical disk that has at least one or more information recording layer therein, wherein there are provided a plurality of spiral information tracks each corresponding to one rotation of the disk on said information recording layer, a plurality of information recording units are arranged on said plurality of tracks, and an integer multiple of the length of said information recording unit is different from the length of the track corresponding to one rotation of said optical disk by at least 5 $\mu$m or more.

4. An optical disk according to claim 3, wherein, from among combinations of two integers N and M such that the integer N times the length of said information recording unit agrees with the integer M times the length of said track, selected is a minimum combination of N and M (referred to as n and m), and the integer m is larger than 5.

5. An optical disk that has at least one or more information recording layer and has a plurality of spiral tracks each consisting of a groove and/or a land and each corresponding to one rotation of the disk on said information recording layer, said track is wobbled in a radial direction, there exists an integer j such that the integer j times the length of said wobble agrees with the length of the one track, the length of the information recording unit arranged on the track is the integer k times the period of said wobble, and a least common multiple L of the integers j and k is not less than 5 times the integer j.

6. An optical disk having at least one or more information recording layer therein, wherein there are provided at least a plurality of spiral information tracks each corresponding to one rotation of the disk on said information recording layer, said information recording track is wobbled in a radial direction of said optical disk, phases of said wobbles are almost in-phase between adjacent tracks, there are provided plural pieces of address data on said track, and any two of plural pieces of the address data that are arranged on all the tracks located in a doughnut region demarcated by concentric circles with a separation of 5 $\mu$m in a radial direction are arranged such that their top ends are separated by at least 5 $\mu$m or more in the circumferential direction.

7. An optical disk according to claim 1, wherein said plurality of spiral tracks each consist of a groove and/or a land, and wherein each of said track tracks is formed with its locus being wobbled in a radial direction, and address data arranged on said a respective track is formed so as to be separated from said address data of an adjacent track in the circumferential direction by an integer multiple of the wobble period.

8. An optical disk according to claim 7, wherein ID information or said address data is formed in the form of embossed pits, the embossed pits are arranged on an extension line of a boundary line between said groove track and said land track, and an interrupted part of the groove is arranged so that there exist no physical grooves in the embossed pit parts of four most adjacent tracks including two tracks on whose boundary the embossed pits are arranged.

9. An optical disk according to claim 7, wherein there exists a region where physical groove is interrupted (interrupted part of the groove), ID information or said address data is formed in the form of the embossed pits, and the embossed pits are arranged on the centerline of the groove track at the interrupted part of the groove.

10. An optical disk according to claim 9, wherein said embossed pits are arranged also on the center line of the land track, and physical groove is interrupted on a part of the groove track that is adjacent to a part of the land track where said embossed pits are arranged.

11. An optical disk according to claim 1, where the embossed pits that represent all of or part of the recording address data are arranged in a radial direction of said optical disk.

12. An optical disk according to claim 1, wherein said optical disk has at least two or more information recording layers that can be accessed from one side, and at least one of said information recording layers is either of a recordable type or of an overwrite type.

13. An optical disk having a plurality of information tracks therein, said information tracks are wobbled in a radial direction of said optical disk, said information tracks each have a plurality of information recording units, said information recording units are in synchronization with a wobble period, any two of the information recording units that are arranged on all the information tracks located in a doughnut region demarcated by two concentric circles with a spacing of 5 $\mu$m in a radial direction of said optical disk are arranged such that their top ends are shifted in the circumferential direction.

14. An optical disk according to claim 13, wherein said top ends of the information recording units are arranged so as to be separated in the circumferential direction by 5 $\mu$m or more.

* * * * *